March 7, 1933.  J. A. WALLER  1,900,083
SAW SETTING DEVICE
Filed Nov. 7, 1929   3 Sheets-Sheet 1
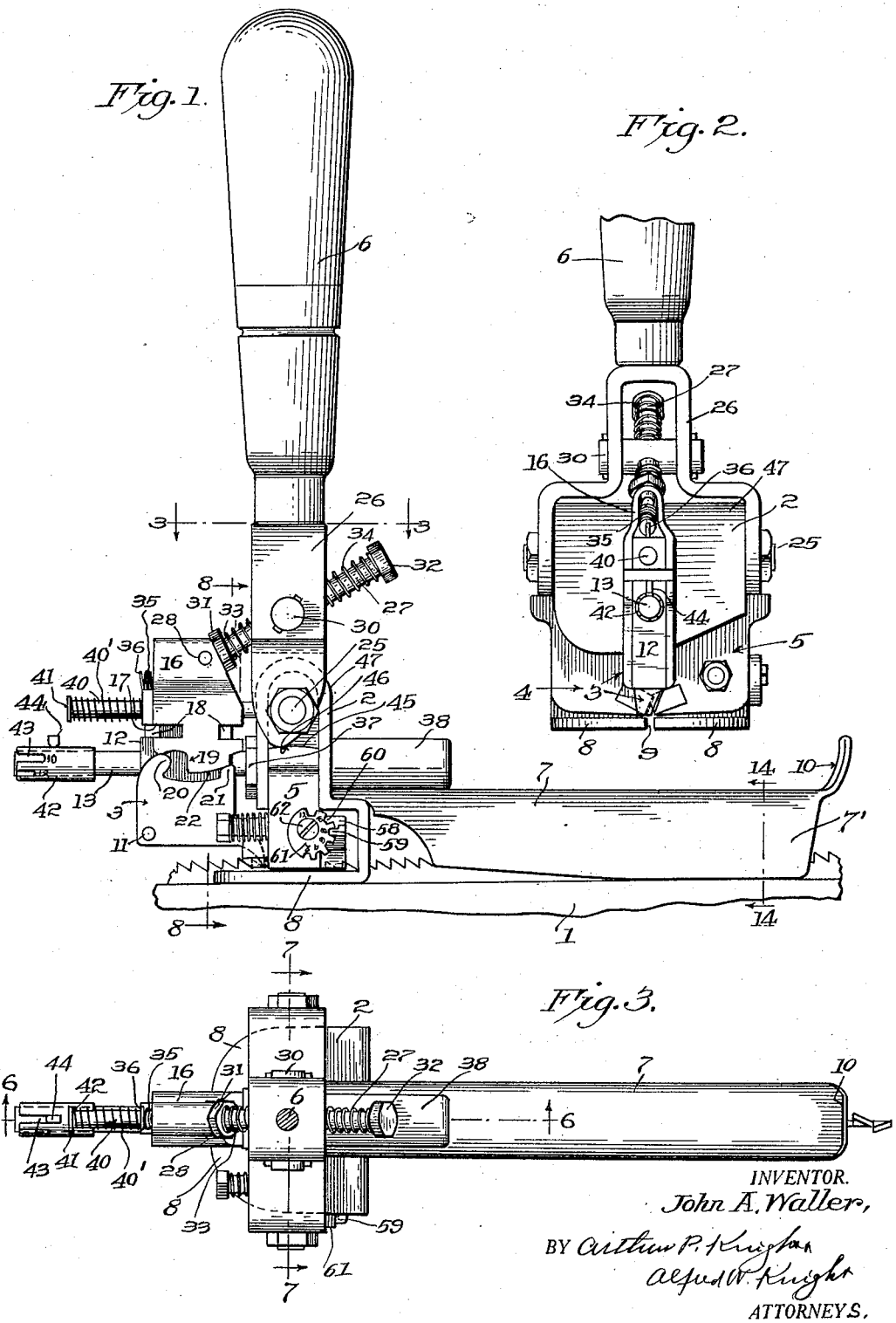
INVENTOR.
John A. Waller,
BY Arthur P. Knight
Alfred W. Knight
ATTORNEYS.

March 7, 1933.  J. A. WALLER  1,900,083
SAW SETTING DEVICE
Filed Nov. 7, 1929  3 Sheets-Sheet 2

INVENTOR.
John A. Waller,
BY
ATTORNEYS

March 7, 1933.    J. A. WALLER    1,900,083
SAW SETTING DEVICE
Filed Nov. 7, 1929    3 Sheets-Sheet 3
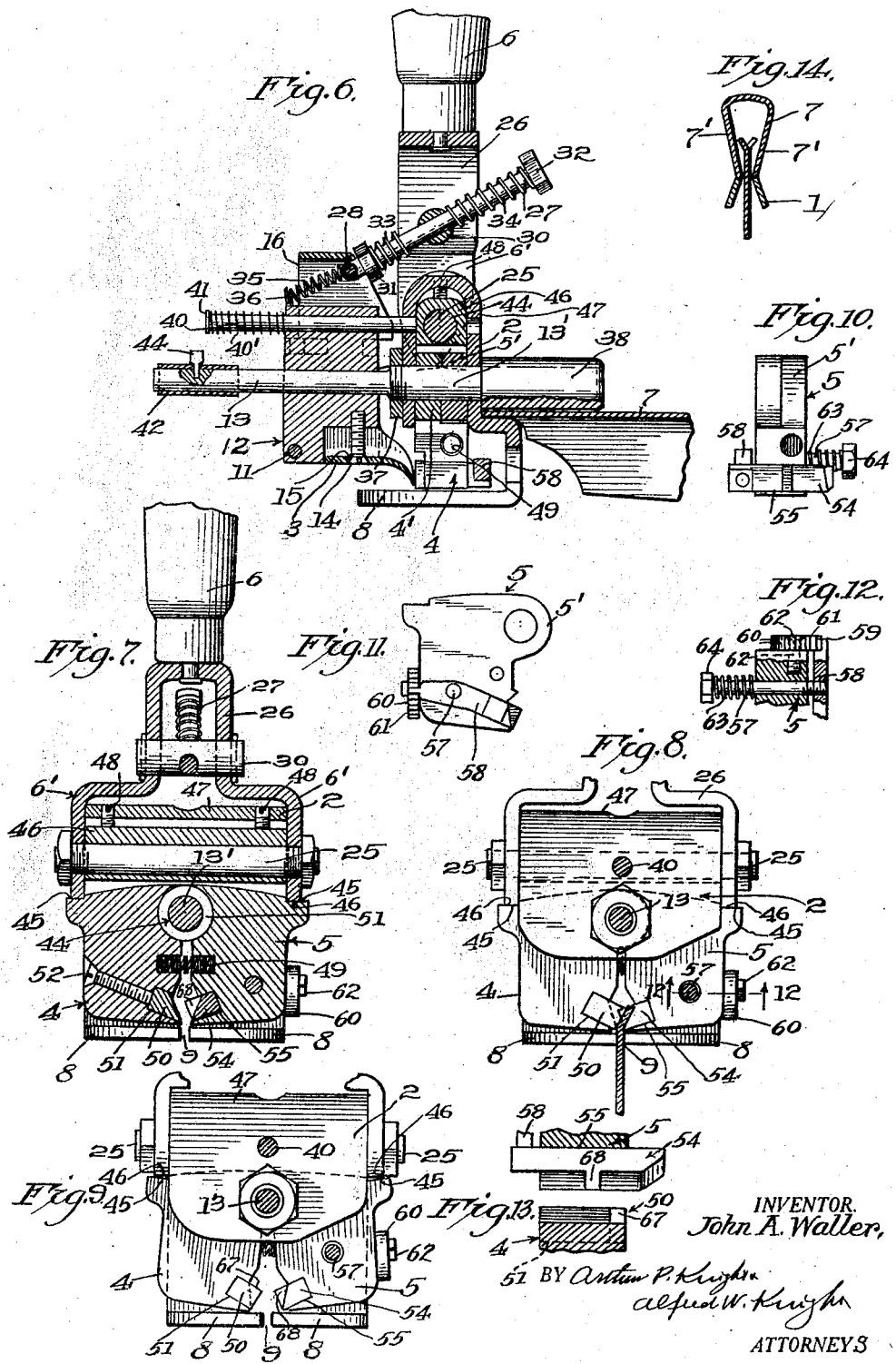
INVENTOR.
John A. Waller,
BY Arthur P. Knight
Alfred W. Knight
ATTORNEYS Patented Mar. 7, 1933

1,900,083

UNITED STATES PATENT OFFICE

JOHN A. WALLER, OF BEVERLY HILLS, CALIFORNIA, ASSIGNOR TO WALLER MANUFACTURING CORPORATION, LTD., OF LOS ANGELES, CALIFORNIA, A CORPORATION OF NEVADA

SAW SETTING DEVICE

Application filed November 7, 1929. Serial No. 405,339.

This invention relates to an improvement in saw sets and the main object of the invention is to provide a device which can be used to set the teeth of a saw rapidly and accurately.

Another object of the invention is to provide means for adjusting the saw set to teeth of different spacings. Other objects of the invention will appear hereinafter.

A further object of the invention is to provide for simultaneous setting of reversely directed teeth, at each operation of the device.

Another object of the invention is to provide for effecting the setting and advancing operations of the setting device by one and the same handle means.

The accompanying drawings illustrate embodiments of my invention and referring thereto:

Fig. 1 is a side elevation of the saw set in position on a saw.

Fig. 2 is an end elevation.

Fig. 3 is a section on line 3—3 in Fig. 1.

Fig. 6 is a vertical section on line 6—6 in Fig. 3.

Fig. 7 is a vertical section on line 7—7 in Fig. 3.

Fig. 8 is a vertical section on line 8—8 in Fig. 1.

Fig. 9 is a view similar to Fig. 8 showing the parts in position corresponding to Fig. 5 in which the jaws are retracted.

Fig. 10 is an inverted plan view of a means for adjusting the position of one of the setting dies.

Fig. 11 is an elevation of the part shown in Fig. 10.

Fig. 12 is a section on line 12—12 in Fig. 8.

Fig. 13 is a section on line 13—13 in Fig. 8.

Fig. 14 is a section on line 14—14 in Fig. 1.

Figure 4:
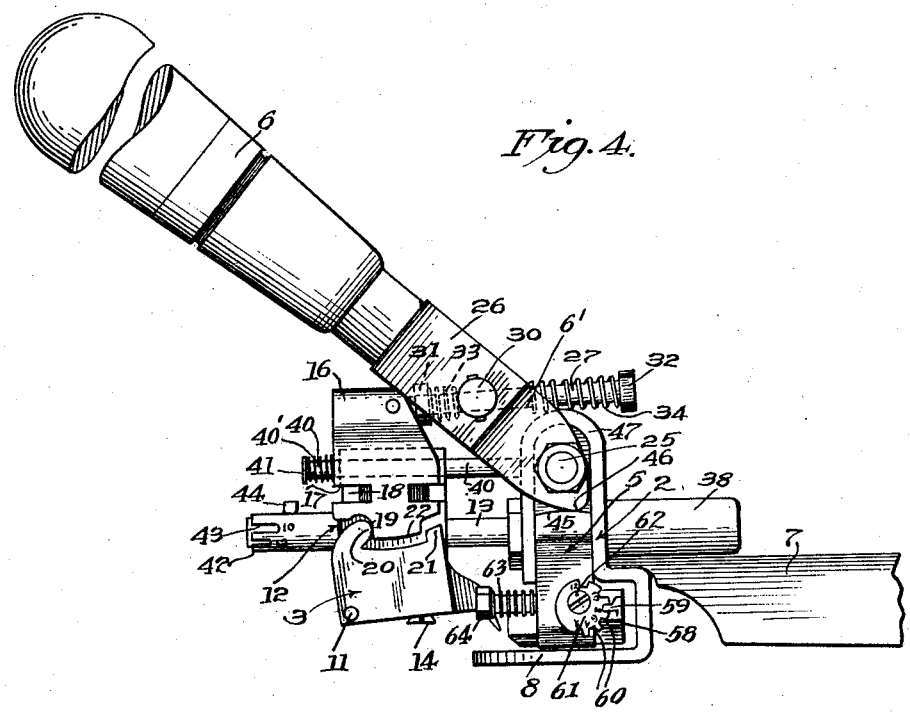
Fig. 4 is a side elevation of the device showing the parts in position at the advance end of each stroke.

My improved saw set is adapted to be mounted on the saw while the saw is supported by any suitable means, for example, such as a saw clamp. In Figs. 1 and 14 the upper edge portions of said clamp means are indicated at 1, these portions being, for example, the top portions of suitable clamp bars of a saw clamp whereby the saw is held in fixed position for the setting operation. As such saw clamp forms no part of my present invention, the same is not shown in detail.

The saw set comprises a supporting body 2, pawl means 3 mounted on said body and adapted to engage the teeth of the saw to advance the device along the saw, jaws 4 and 5 mounted on said body and adapted to engage the saw teeth to set the same and handle means 6 mounted on said body and adapted to operate said pawl means and setting jaws.

Body 2 is provided at its bottom with two arms 8 adapted to embrace the saw, these arms being separated by a kerf or slot 9 which approximately fits the saw blade so as to guide the device on the saw. In order to enable the device to be conveniently manipulated a rearward extension 7 is preferably provided, secured to the body 2 and extending rearwardly therefrom, said extension member having downwardly extending flanges 7' which are adapted to embrace the saw so as to maintain the frame or support of the saw set in proper position. Member 7 is rounded on top and provided with an upward projection 10 at its rear end, so as to enable it to be conveniently used as a hand hold in manipulating the device.

The pawl means 3 is pivotally mounted at 11 on a pawl carrier member 12 mounted to slide on a pin or rod 13 secured to the body 2. A stop screw 14 secured to member 12 extends through a slot 15 in the pawl member 3 and is adapted to engage said pawl member so as to limit the downward movement thereof. An operating member 16 is mounted to slide horizontally on the pawl carrier member 12, for example, by engagement of slots 17 in said member 16 with lugs 18 on member 12. Said operating member 16 is formed as a U-shaped member embracing member 12 and has a shoulder 19 on each side thereof adapted to engage a projection 20 on the corresponding side of the pawl means 3. Said pawl means is preferably formed as a U-shaped member embracing member 12 and having the projections 20 formed at the upper end of the extreme forward portion thereof. At the rear portion of the upward extensions of the pawl member 3 are provided bearing faces 21 adapted to be engaged by inclined bearing faces 22 on the operating member 16 when said operating member is moved rearwardly.

The operation of the pawl means is effected by means of a handle 6, said handle having pivotal connection at 25 to the body 2 and having U-shaped shank portion 26 embracing a rod 27 which is pivoted at 28 to the member 16 and extends through a cross pin 30 on the shank 26 of said handle. Nuts 31 and 32 are mounted for screw adjustment on the rod 27 and springs 33 and 34 are interposed between the respective nuts 31 and 32 and the cross pin 30 on the handle so that operation of the handle in either direction will operate through one or the other of said springs 33 or 34 to move the member 16 forwardly or rearwardly as the case may be. A spring 35 interposed between a projection 36 on member 12 and a part connected to the member 16, for example, the pivot 28 aforesaid, tends to move the member 16 rearwardly on the supporting member 12.

The supporting pin or rod 13 may be secured on body 2 by a nut 37 and head 38, and an additional supporting pin or rod 40 may be provided on body 2 and extending through a suitable bore in member 12 to assist in guiding the same. A spring 41 may be mounted on rod 40 between member 12 and a shoulder 40' on said rod so as to tend to force the pawl carrier and the parts carried thereby rearwardly, that is toward the body 2. Means are provided for variably limiting the reciprocating movement on member 12 on guide pin 13 comprising, for example, a sleeve 42 slidably mounted on said pin and having at its forward end a series of notches 43 of different depth adapted to engage a projection or stud 44 on the guide pin 13.

The jaws 4 and 5 are both mounted pivotally on the body 2, for example, by means of lugs 4' and 5' on said jaws, said lugs being provided with bores 44 fitting on a bearing portion 13' on a pin or rod 13 so that the two jaw members 4 and 5 are hinged together to swing to and from one another on a common center. A spring 49 is interposed between the jaws 4 and 5 and tends to separate said jaws. Each of the jaws 4 and 5 is provided with a shoulder or bearing face 45 adapted to be engaged by a cam face 46 on the handle means 6, said handle means having arms 6' extending downwardly at each end of the body member 2 and formed with the cam face 45 at its lower end. In order to provide for adjustment of the throw of the cam means I prefer to mount the pivotal connection 25 for the handle member 6 in a block 46 which slides within U-shaped portion 47 of the body 2 and may be adjusted vertically by one or more adjusting screws 48 screwing through the top of the body 2 and engaging the top of the bearing member 46 as shown in Figs. 6 and 7.

The U-shaped portion of the body 2 extends down on each side of the jaws 4 and 5 so as to support the same at front and rear. Said jaws 4 and 5 are provided with die means for engaging the saw teeth in the setting operation. The jaw 4 is shown as provided with a die 50 slidably mounted in a guideway 51 therein and adjusted by a screw 52 screwing in the jaw 4 and engaging in the back of the die.

The jaw 5 is provided with a die 54 slidably mounted in a guideway 55 therein and adjustable longitudinally of the device, that is to say, in a direction transverse of the motion of the jaws. This adjustment of the die 54 is provided, for example, by means of a pin 57 slidably mounted in the jaw 5 and connected to the die 54 by a cross arm 58, one arm of said cross arm having a lug 59 adapted to engage in any one of a series of notches 60 in a disc 61 pivotally mounted at 62 on the jaw 5, said notches being of varying depth so as to control the longitudinal position of the die 54 in the jaw 5. A spring 63 is interposed between a head 64 on pin 57 and the jaw 5 so as to tend to hold the projection 59 on cross arm 58 in engagement with any notch 60 in which it may be inserted.

Die 50 is provided with a tooth-setting projection 67 and die 54 is provided with tooth setting projection 68, these tooth-setting projections extending from the dies toward the median plane of the device, which is the plane of the saw, and being adapted to engage contiguous teeth of the saw. It is to be noted that the adjustment of the die 50 provides for controlling the relative distance of the tooth-setting projections in the direction of movement of the jaws, and therefore, determines the amount of set, and the adjustment of the die 54 provides for controlling the relative distance of the tooth-setting projections in the direction transverse to the movement of the jaws and parallel to the line of the saw teeth so as to provide for varying the distance of the tooth-setting projection in accordance with the spacing of the teeth on the saw.

The operation of the device above described is as follows: Sleeve 42 and disk 61 are adjusted to correspond to the spacing of the teeth on the saw which is to be set. The device is grasped by the body member 2 and the extension 7 thereof and placed over the toothed edge of the saw which is assumed to be held in fixed position by means of a suitable saw clamp, the upper edge of which is indicated at 1, the device being so placed that the members 3 thereof and the portions 7' of the member 7 also rest on the support 1 and embrace the saw so to guide the device in the plane of the saw. To avoid wear on the saw teeth it is preferred to cause the flange portions 7' to rest on the support 1, as stated. The forward end of the device is, however, supported by pawl 3 riding on the saw teeth. The handle 2 is moved or reciprocated forwardly and rearwardly to perform the setting operation. At each forward movement, the handle operates through the pin 30 and rod 27 to slide the member 17 forwardly on the member 12 (forward movement of member 12 being resisted by spring 41) until shoulder 19 on member 17 engages projection 20 on pawl member 3, thereby raising the pawl 3 out of contact with the saw teeth and in the further forward movement of the handle 2, the projection 21 at the rear end of the pawl member 3 comes in contact with the face 22 on the member 17 thereby limiting the upward movement of the pawl member, and in the further movement of the parts under the forward operation of the handle, the members 17, 12 and 3 move bodily forward (against the action of spring 41) a distance sufficient to carry them forward over to successive teeth of the saw. In the ensuing rearward movement of the handle 2, the member 17 first moves rearwardly with relation to member 12 under the action of spring 35 so as to remove shoulder 19 from projection 20 and pawl 3 then falls into one of the notches between two of the teeth of the saw and in the further rearward movement, the inclined face 22 engages with the projection 21 to hold the pawl member firmly down between the saw teeth.

Figure 5:
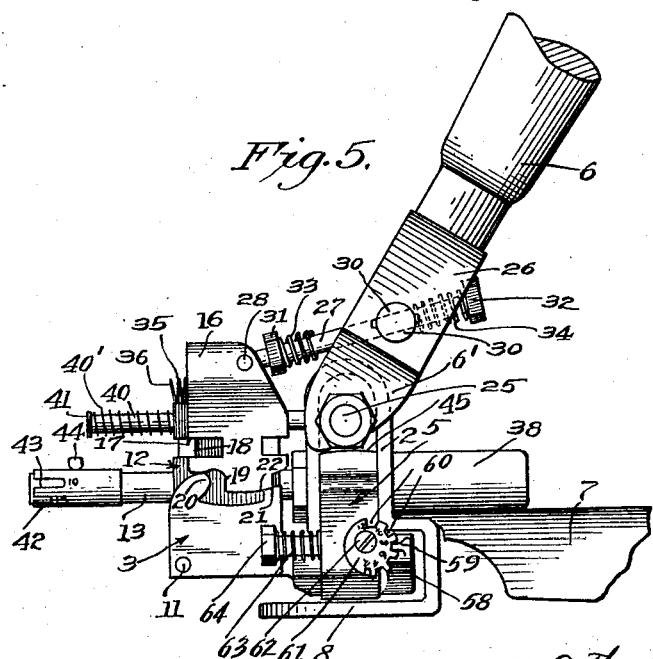
Fig. 5 is a side elevation showing the position of the parts at the retracted end of the stroke.

Further rearward movement of handle 2 causes it to operate as a lever, pulling the device forward on the saw, the engagement of pawl 3 with the saw tooth giving a fixed point of support so that the pivot member 3 is held in fixed position and the pivotal connection 25 of the handle with the body 2 is moved forward and correspondingly advances the jaws 4 and 5 carried thereby. The amount of this advance is determined by the amount of advance which has previously been given to the pawl and this in turn is determined by the adjustment of the stop means 42 so as to advance the device the distance corresponding to two teeth saws. Fig. 5 shows the positions of the parts when this rearward movement of the handle has been completed. As the handle moves forward from this rearward position, the cam faces 46 thereon engage with the shoulders 45 on the respective jaws 4 and 5 so as to force the lower ends of said jaws toward one another and cause the die projections 67 and 68 thereon to engage the saw teeth to set the same, it being understood that these die projections are spaced apart along the line of the saw teeth at a distance corresponding to the spacing of the saw teeth so that as the die projections move inwardly toward the center of the saw, they will operate in opposite directions on successive saw teeth to set the same oppositely. When the handle passes its upright position as shown in Fig. 1, this setting operation is assumed to be completed and the continued forward movement results in a further advance of the pawl for a repetition of the operation.

The adjustment of the pivotal support of the handle by the screw means 48 enables the setting projections to be properly positioned with reference to the upper edges of the saw teeth.

Various modifications may be made in the details of the construction above described without departing from my invention.

I claim:

1. A saw setting device comprising a body, guide means carried by said body and extending in the direction of movement of the body, a pawl carrier mounted to slide longitudinally along said guide means, a pawl member pivotally mounted on said pawl carrier and adapted to engage the teeth of the saw, an operating member movably operated on said pawl carrier, said operating member and pawl member being provided with inter-engaging portions adapted to lift the pawl member off the saw teeth when the operating member is moved to advanced position on the pawl carrier, a handle member pivotally mounted on said body, a connection between said handle member and said operating member to move the said operating member so as to operate the pawl member by operation of the handle member, jaw means mounted on said body and provided with saw tooth setting projections and means for operation of said jaw means by operation of said handle member.

2. A construction as set forth in claim 1 and comprising, in addition, adjustable stop means on the said guide means on the body for limiting the forward movement of the said pawl carrier.

3. A construction as set forth in claim 1 and comprising, in addition, stop means for limiting the pivotal movement of the said pawl member on the pawl carrier.

4. A construction as set forth in claim 1 and comprising, in addition, inter-engaging means on the pawl member and the operating means therefor adapted to inter-engage in the rearward movement of the operating means to hold the pawl means down on to the saw teeth.

5. A construction as set forth in claim 1 and comprising, in addition, resilient means interposed between the handle member and the pawl operating member for effecting resilient operation of the operating member in both directions and means for adjustably limiting the forward movement of the pawl carrier.

6. A saw setting device comprising a body provided with means for supporting and guiding the same along the toothed edge of a saw, pawl means movably mounted on said body and adapted to engage the saw teeth for advancing the device along the saw, jaws pivotally mounted on said body and provided with saw tooth setting projections, handle means pivotally connected to said body and operatively associated with said jaws, said jaws being provided with bearing faces and said handle being provided with cam faces adapted to engage said bearing faces for operation of said jaws to effect setting of the saw teeth during one portion of the stroke of the handle, means for connecting said handle to said pawl means for operation of said means in another portion of the stroke of the handle, and means for adjusting the pivotal connection of said handle with the body toward or from the line of saw teeth.

7. In a saw setting device, a jaw mounted for movement toward and from the teeth of a saw, a die provided with tooth engaging projection and mounted to move on said jaw in a direction parallel to the line of the saw teeth, spring means tending to hold said die toward one end of its path of movement on said jaw, and adjustable positioning means on said jaw having a plurality of stop means thereon and movable to bring any one of said stop means in position for engagement with a stop member connected to said die, the several stop means on said positioning means being so disposed as to hold said die in different positions on said jaw corresponding to different spacings of saw teeth, jaw and die means adapted to cooperate with aforesaid jaw and die to set a saw tooth, and means for actuating said jaw.

In testimony whereof I have hereunto subscribed my name this 25th day of October, 1929.

JOHN A. WALLER.